United States Patent [19]
Child

[11] Patent Number: 4,997,800
[45] Date of Patent: Mar. 5, 1991

[54] FLUIDIZED BED COMBUSTION

[75] Inventor: Jonathan E. Child, Sewell, N.J.

[73] Assignee: Mobil Oil Corporation, Fairfax, Va.

[21] Appl. No.: 322,753

[22] Filed: Mar. 13, 1989

Related U.S. Application Data

[63] Continuation-in-part of Ser. No. 84,243, Aug. 12, 1987, Pat. No. 4,812,431.

[51] Int. Cl.$^5$ .......................... B01J 38/36; B01J 29/38; C10G 11/18; C01B 21/20
[52] U.S. Cl. ...................... 502/42; 208/113; 208/120; 208/164; 422/144; 423/235; 502/21; 502/41
[58] Field of Search ............... 502/42, 41, 43, 21; 208/164

[56] References Cited

U.S. PATENT DOCUMENTS

| | | | |
|---|---|---|---|
| 3,554,903 | 1/1971 | Wilson | 208/164 |
| 4,180,454 | 12/1979 | Luckenbach | 208/164 |
| 4,222,856 | 9/1980 | Hansel | 502/41 |
| 4,309,309 | 1/1982 | Blanton, Jr. | 208/164 |
| 4,388,877 | 6/1983 | Molayem et al. | 110/342 |
| 4,515,092 | 5/1985 | Walsh et al. | 110/347 |
| 4,579,070 | 4/1986 | Lin et al. | 110/345 |
| 4,735,705 | 4/1988 | Burk, Jr. et al. | 208/113 |

Primary Examiner—Paul E. Konopka
Attorney, Agent, or Firm—Alexander J. McKillop; Charles J. Speciale; Richard D. Stone

[57] ABSTRACT

A process for fluidized bed catalyst regeneration while minimizing emissions of NOx. The process uses a single, dense phase fluidized bed of particles wherein a combustible substance is burned to produce heat and a flue gas containing CO, CO2, O2 and NOx. A CO combustion promoter, present in an amount sufficient to increase the combustion of CO to CO2 in the dense bed, is disposed on particles having a settling velocity which is smaller than the settling velocity of the particles in the dense phase fluidized bed. CO combustion promoter segregates in the dense phase fluidized bed so that a majority of the combustion promoter is present in an upper one half of the dense bed. Maintaining a reducing atmosphere in the lower one half of the dense bed converts at least a portion of the NOx produced during combustion to nitrogen in the reducing atmosphere. Preferably an external means is provided to recover entrained CO combustion promoter from fines generated in the fluidized bed. An external, dense phase fluidized bed may be used to effect separation by density differences, or flotation separation, using a liquid with a density intermediate the density of the promoter and the fines may be used.

11 Claims, 3 Drawing Sheets

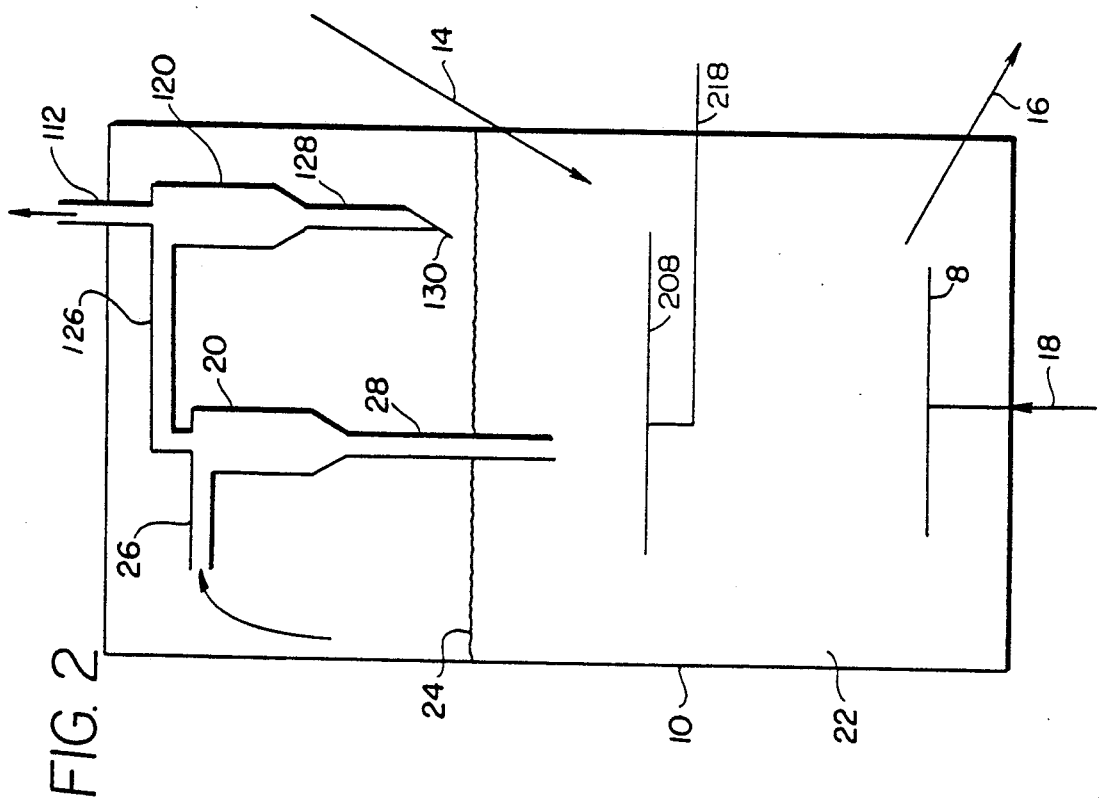
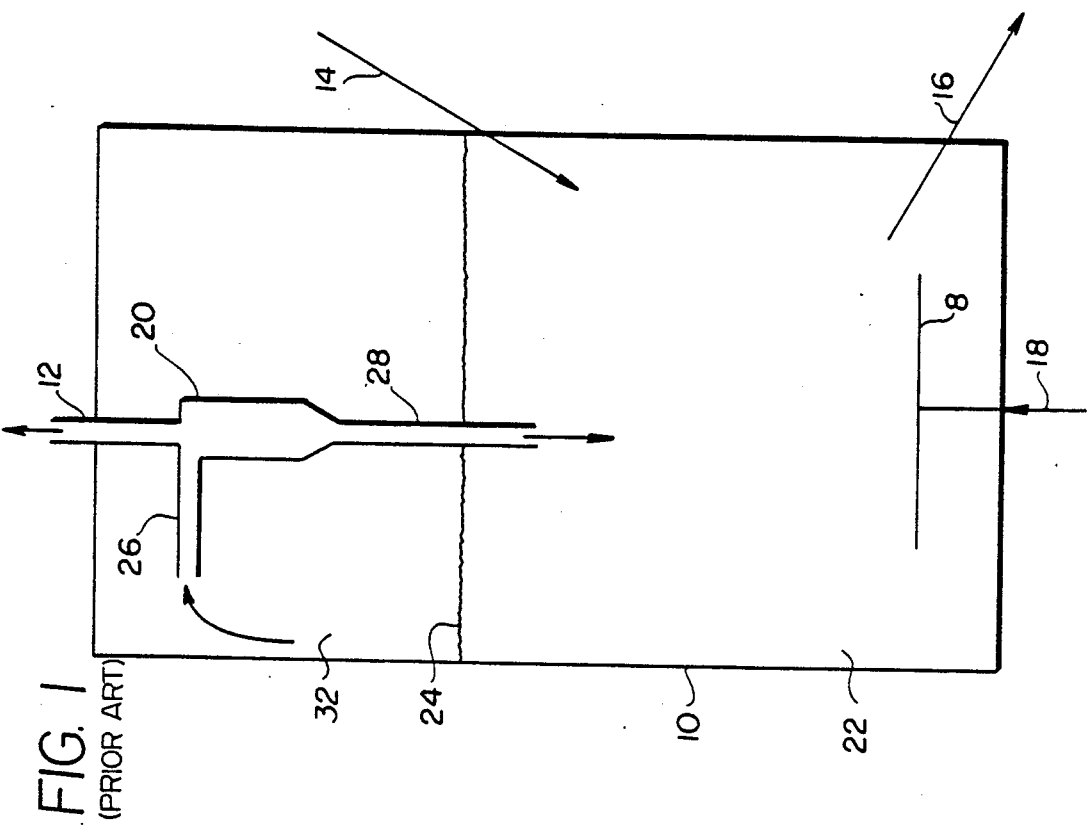

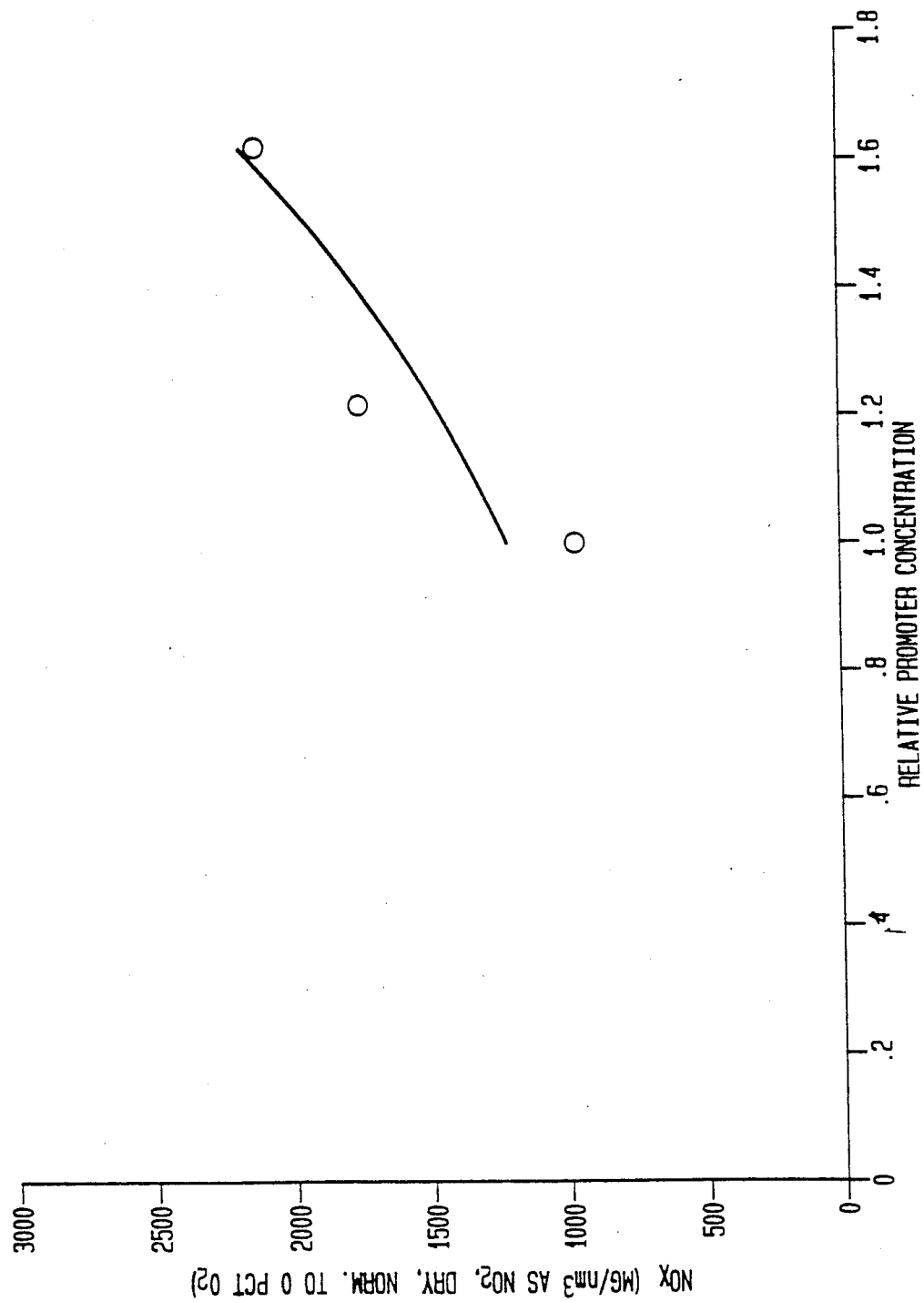

FLUIDIZED BED COMBUSTION

CROSS-REFERENCE TO RELATED APPLICATIONS

This application is a Continuation-In-Part of prior co-pending application Ser. No. 084,243, now U.S. Pat. No. 4,812,431, which is incorporated herein by reference.

BACKGROUND OF THE INVENTION

1. Field of the Invention

The field of the invention is regeneration of coked cracking catalyst in a fluidized bed.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425 C.–600 C., usually 460C.–560 C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500 C.–900 C., usually 600 C.–750 C. Flue gas formed by burning coke in the regenerator may be treated for removal of particulates and for conversion of carbon monoxide, after which the flue gas is normally discharged into the atmosphere.

Most FCC units now use zeolite-containing catalyst having high activity and selectivity. These catalysts work best when the amount of coke on the catalyst after regeneration is relatively low. It is desirable to regenerate zeolite catalysts to as low a residual carbon level as is possible. It is also desirable to burn CO completely within the catalyst regenerator system to conserve heat and to minimize air pollution. Heat conservation is especially important when the concentration of coke on the spent catalyst is relatively low as a result of high catalyst selectivity. Among the ways suggested to decrease the amount of carbon on regenerated catalyst and to burn CO in the regenerator is to add a CO combustion promoter metal to the catalyst or to the regenerator. Metals have been added as an integral component of the cracking catalyst and as a component of a discrete particulate additive, in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121, incorporated herein by reference, introduced relatively large-sized particles containing CO combustion-promoting metal into a cracking catalyst regenerator. The circulating particulate solids inventory, of small-sized catalyst particles, are cycled between the cracking reactor and the catalyst regenerator, while the combustion-promoting particles remain in the regenerator. Oxidation-promoting metals such as cobalt, copper, nickel, manganese, copper-chromite, etc., impregnated on an inorganic oxide such as alumina, are disclosed.

U.S. Pat. No(s). 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory.

Some work has been done on promoting carbon burning reactions by adding Pt coated sand to a bed of burning coke. Walsh and Green reported that carbon burning rates were increased, and that combustion efficiency improved as well. They required that the Pt be on a relatively low surface area support, and that fairly high Pt concentrations gave better results. Burning a small amount of solid fuel in a bed of sand, with no promoter being on the sand, gave a coke burning rate of 1.0 (base), while use of sand containing 1 wt % Pt increased the burning rate of the coke to 2.3. Essentially complete CO combustion to CO2 was always obtained, but the amount of Pt present was relatively large, 1 wt % of the fluidized bed, while the fuel was present in amounts ranging from 0.1 to 10 wt % of the fluidized bed.

The patentees sought to avoid the problem of Pt loss by using a substrate which would remain in the fluidized bed.

Sand, and other low surface area materials were the preferred substrates for the Pt, but the possibility of using higher surface area supports, such as silica alumina, gamma alumina, and silica was mentioned, but no examples were provided on a support other than sand (80–240 mesh sand was used in the experiments).

Recovery of Pt on promoter from fines for recycle to the fluidized bed unit was not addressed.

Many FCC units use CO combustion promoters. This reduces CO emissions, but usually increases nitrogen oxides (NOx) in the regenerator flue gas. It is difficult in a catalyst regenerator to completely burn coke and CO in the regenerator without increasing the NOx content of the regenerator flue gas.

Although many refiners have recognized the problem of NOx emissions from FCC regenerators, the solutions proposed have not been completely satisfactory. The approaches taken so far have generally been directed to special catalysts which will inhibit the formation of NOx in the FCC regenerator, or to process changes which reduce NOx emissions from the regenerator.

Recent catalyst patents include U.S. Pat. No. 4,300,997 and its division U.S. Pat. No. 4,350,615, both directed to the use of Pd-Ru CO-combustion promoter. The bi-metallic CO combustion promoter is reported to do an adequate job of converting CO to CO2, while minimizing the formation of NOx.

Another catalyst development is disclosed in U.S. Pat. No. 4,199,435 which suggests steam treating conventional metallic CO combustion promoter to decrease NOx formation without impairing too much the CO combustion activity of the promoter.

Process modifications are suggested in U.S. Pat. No(s). 4,413,573 and 4,325,833 directed to two- and three-stage FCC regenerators, which reduce NOx emissions.

U.S. Pat. No. 4,313,848 teaches countercurrent regeneration of spent FCC catalyst, without backmixing, to minimize NOx emissions.

U.S. Pat. No. 4,309,309 teaches the addition of a vaporizable fuel to the upper portion of FCC regenerator to minimize NOx emissions. Oxides of nitrogen formed in the lower portion of the regenerator are reduced in the reducing atmosphere generated by burning fuel in the upper portion of the regenerator.

U.S. Pat. No. 4,235,704 suggests that too much CO combustion promoter causes NOx formation, and calls for monitoring the NOx content of the flue gases, and adjusting the concentration of CO combustion promoter in the regenerator based on the amount of NOx in the flue gas.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above from U.S. Pat. No(s). 4,300,997 to 4,542,114, are incorporated herein by reference.

In addition to the above patents, there are myriad patents on treatment of flue gases containing NOx. The flue gas might originate from FCC units, or other units. U.S. Pat. No(s). 4,521,389 and 4,434,147 disclose adding NH3 to NOx containing flue gas to catalytically reduce the NOx to nitrogen.

None of the approaches described above provides the perfect solution. Process approaches which reduce NOx emissions require extensive rebuilding of the FCC regenerator.

Various catalytic approaches, e.g., use of bi-metallic CO combustion promoters, provide some assistance, but the cost and complexity of a bi-metallic combustion promoter is necessary. The reduction in NOx emissions achieved by catalytic approaches helps some but still may fail to meet the ever more stringent NOx emissions limits set by local governing bodies. Much of the NOx formed is not the result of combustion of N2 within the FCC regenerator, but rather combustion of nitrogen-containing compounds in the coke entering the FCC regenerator. Bi-metallic combustion promoters are probably best at minimizing NOx formation from N2.

I have discovered a way to overcome most of the deficiencies of the prior art methods of reducing NOx emissions from an FCC regenerator. I use conventional CO combustion promoter metals in an unconventional way. By segregating most of the CO combustion promoter within the upper portion of an FCC regenerator dense bed I significantly reduce NOx emissions while maintaining satisfactory CO combustion. The approach was, in a sense, to turn the teaching of U.S. Pat. No. 3,808,121 upside down. The '121 patent added large-sized particles containing a CO combustion-promoting metal into an FCC regenerator. These particles, because of their size and weight, congregated at the bottom of the FCC regenerator dense bed. Withdrawal of hot regenerated catalyst occurred from an upper level of the FCC regenerator dense bed, so only the small-sized FCC catalyst cycled back and forth between the reactor.

In my process it is irrelevant whether or not the CO combustion promoter enters the cracking reactor, while it is essential that the CO combustion promoter concentrate at the top of the bed of the FCC regenerator.

BRIEF SUMMARY OF THE INVENTION

Accordingly, the present invention provides in a fluidized combustion process wherein oxygen or an oxygen containing gas is added to a single, dense phase fluidized bed of particles having an average particle size and an average settling velocity, said dense bed comprising a lower one half and an upper one half, and wherein a combustible substance is burned in the dense bed to produce heat and a flue gas containing CO, CO2, O2 and NOx, the improvement comprising adding a CO combustion promoter in an amount sufficient to increase the combustion of CO to CO2 in the dense bed, said CO combustion promoter being disposed on particles having a settling velocity which is smaller than the settling velocity of the average particles in the dense phase fluidized bed whereby said CO combustion promoter segregates in the dense phase fluidized bed so that a majority of the combustion promoter is present in the upper one half of the dense bed and maintaining a reducing atmosphere in the lower one half of the dense bed and converting therein at least a portion of the NOx produced during combustion to nitrogen in the reducing atmosphere.

In another embodiment, the present invention provides an apparatus for the fluidized bed regeneration of fluidized catalytic cracking catalyst, having a conventional density, particle size and settling velocity, which catalyst has become deactivated by the deposition of nitrogenous coke thereon during use, by contacting the coked catalyst with oxygen or an oxygen containing gas in a single, dense phase fluidized bed comprising a lower two thirds and an upper one third, and wherein the nitrogenous coke is burned in the dense bed to produce heat and a flue gas containing CO, CO2, O2 and NOx, the improvement comprising adding a CO combustion promoter in an amount sufficient to increase the combustion of CO to CO2 in the dense bed, said CO combustion promoter being disposed on particles having a settling velocity which is smaller than the settling velocity of the conventional catalyst particles in the dense bed whereby said CO combustion promoter segregates in the dense phase fluidized bed so that a majority of the combustion promoter is present in the upper one third of the dense bed, a flue gas stream comprising conventional cracking catalyst fines and entrained CO combustion promoter is removed from the catalyst regenerator, a mixture of fines and entrained CO combustion promoter is recovered from the flue gas, and the mixture is resolved by fluidization in a dense phase fluidized bed external to the fluidized bed catalyst regeneration process into a CO combustion promoter rich phase and a fines phase with a reduced concentration of CO combustion promoter, and the promoter rich phase is recycled to the fluidized bed catalyst regeneration process.

BRIEF DESCRIPTION OF THE DRAWINGS

FIG. 1 is a simplified view of a conventional FCC regenerator which can be used in the practice of the present invention.

FIG. 2 is a simplified schematic diagram of a modified FCC regenerator of the present invention.

FIG. 4 shows how NOx emissions vary as a function of relative Pt concentration on FCC catalyst.

DETAILED DESCRIPTION

FCC FEED

Figure 3:
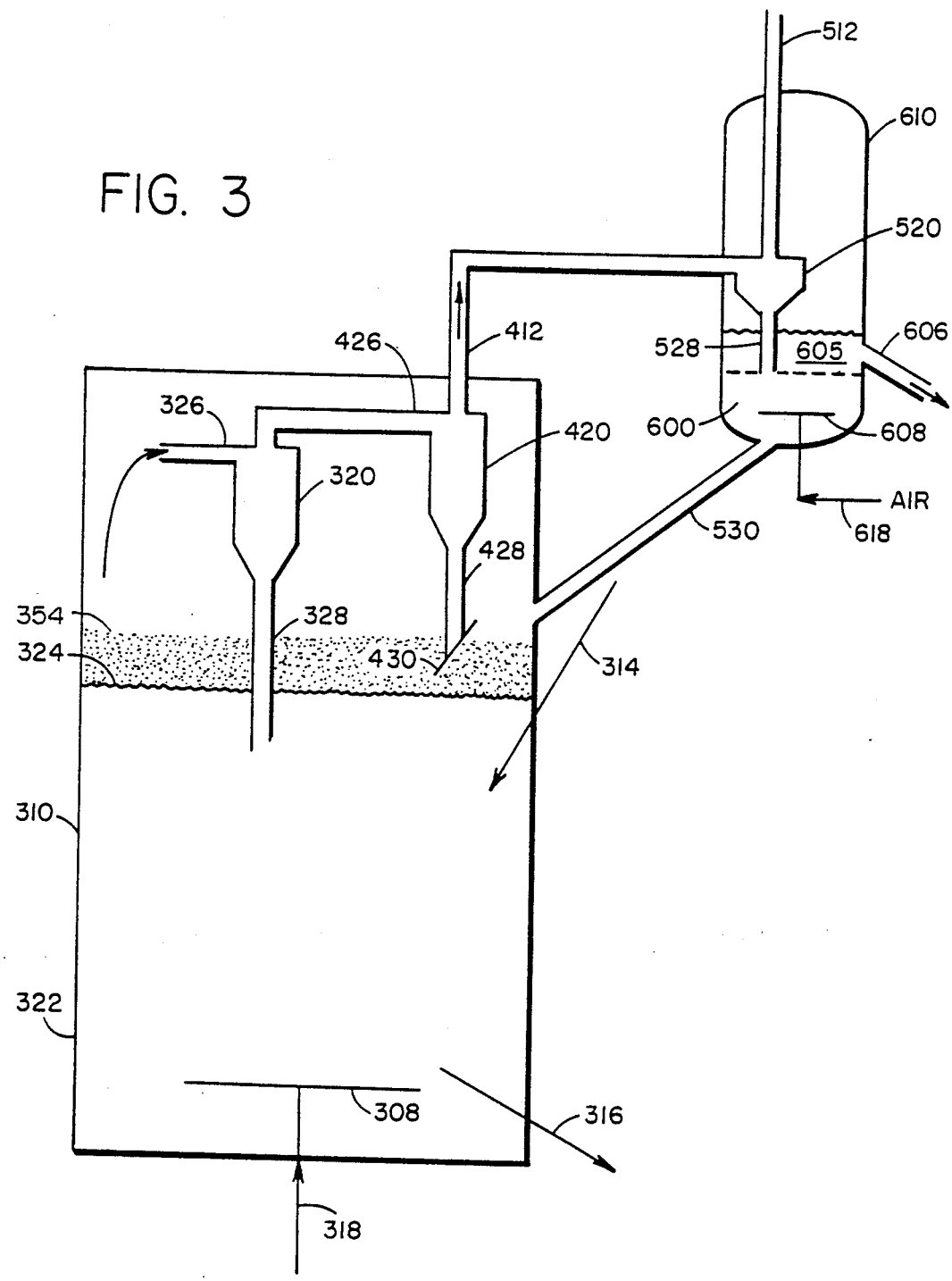
FIG. 3 is a simplified schematic diagram of a preferred FCC regenerator of the invention, with an external promoter recovery means using density differences to recover promoter from catalyst fines.

Any conventional FCC feed can be used. The process of the present invention also makes it possible to use charge stocks which are relatively high in nitrogen content, and which otherwise might result in unacceptable NOx emissions in conventional FCC units. The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

FCC CATALYST

Any conventional FCC catalyst may be used. The catalyst can be 100% amorphous, but preferably includes some zeolite in a porous refractory matrix such as silica-alumina, clay, or the like. The zeolite is usually 5-35 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The catalyst may also contain one or more shape selective zeolites, i.e., those having a Constraint Index of 1-12, and typified by ZSM-5, and other materials having a similar crystal structure.

Relatively high silica zeolite containing catalysts are preferred for use in the present invention. They withstand the high temperatures usually associated with complete combustion of CO to $CO_2$ within the FCC regenerator.

The FCC catalyst composition, per se, forms no part of the present invention.

FCC REACTOR CONDITIONS

Conventional FCC reactor conditions may be used. These conditions include catalyst/oil ratios of 0.5:1 to 15:1 and preferably 3:1 to 8:1, and a catalyst/oil contact time of 0.5-50 seconds, and preferably 1-20 seconds.

The FCC reactor conditions, per se, are conventional and form no part of the present invention.

FLUID BED COMBUSTION ZONES

The invention can be used in any fluidized bed combustion zone such as fluidized bed coal combustion, burning low BTU gas in a fluidized bed, etc. It is especially useful in FCC regenerators.

The bed preferably comprises a single, dense phase fluidized bed, with a relatively sharp demarcation between the dense phase and the dilute phase above it.

BED GEOMETRY

Preferably the bed has a length to diameter ratio, L/D of at least one, and more preferably, at least 2, as measured by the length of the dense phase bed to the diameter of the vessel containing the dense phase bed.

A non-uniform bed is preferred to minimize superficial vapor velocity near the top of the bed. This reduced vapor velocity increases the sharpness of the break between the dense phase bed and the dilute phase bed, and aids in keeping the preferred CO combustion promoters, discussed below, in the dense bed. The non uniform bed geometry may be attained by a flaring outward of the vessel containing the dense bed, but preferably is achieved by a sudden change in bed diameter. Thus the bottom 50% (by volume) of the dense phase fluidized bed could be contained in a vessel of 1 m diameter which is contiguous with, and discharges up into, a 2 m diameter vessel. The sudden change in vapor velocity will increase the retention of the CO combustion promoter while allowing much of the coke combustion to occur in a more robustly fluidized region (the 1 m diameter portion) where vigorous fluidization and rapid combustion to $CO/CO_2$ occur.

FCC REGENERATOR CONDITIONS

The temperatures, pressures, oxygen flow rates, etc., are within the broad ranges of those heretofore found suitable for FCC regenerators, especially those operating with substantially complete combustion of CO to $CO_2$ within the regeneration zone. Suitable and preferred operating conditions are:

|  | Broad | Preferred |
| --- | --- | --- |
| Temperature, °F. | 1100-1700 | 1150-1400 |
| Catalyst Residence Time, Seconds | 60-3600 | 120-600 |
| Pressure, atmospheres | 1-10 | 2-5 |
| % Stoichiometric $O_2$ | 100-120 | 100-105 |

CO COMBUSTION PROMOTER

Use of a CO combustion promoter in the regenerator or combustion zone is essential for the practice of the present invention, however, these materials are well-known.

U.S. Pat. No(s). 4,072,600 and 4,235,754, the contents of which have been incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt ppm platinum present on the catalyst in the unit. In swirl type regenerators, operation with 1 to 7 ppm Pt commonly occurs. Pt can be replaced by other metals, but usually more metal is then required. An amount of promoter which would give a CO oxidation activity equal to 0.3 to 3 wt. ppm of platinum is preferred.

Conventionally, refiners add CO combustion promoter to promote total or partial combustion of CO to $CO_2$ within the FCC regenerator. More CO combustion promoter can be added without undue bad effect—the primary one being the waste of adding more CO combustion promoter than is needed to burn all the CO.

Preferably, the CO combustion promoter is on a support which is readily segregable from the conventional FCC catalyst. Thus, in one preferred embodiment of the present invention, the CO combustion promoter is on a material with about the same density as the FCC catalyst, but of a smaller particle size than the FCC catalyst, so that it tends to congregate in the upper portion of the FCC regenerator bed.

The most preferred promoter, from a standpoint of maximum promoter life, and maximum recovery from catalyst fines, is one which is slightly smaller than the average size of the FCC catalyst, but of much higher density.

The smaller size ensures that the promoter will be readily fluidized, and tend to collect or segregate in the upper portions of the dense bed. The greater density will facilitate recovery of the promoter from catalyst fines in downstream recovery operations. The high density promoter will also be exceptionally strong and resistant to attrition in the FCC regenerator.

For maximum effectiveness, the promoter particle size distribution should have a relatively narrow range, i.e., the promoter size can be critical. If the promoter contains large amounts of particles which have a particle size similar to the FCC catalyst, then it will be difficult to achieve the desired segregation of promoter in the upper portions of the FCC regenerator dense bed. Such materials will not, however, be lost from the system, so there will be no Pt loss penalty associated with having some oversize promoter, just a degradation in segregation which will reduce somewhat the skewed Pt distribution sought in the regenerator.

The bulk of the promoter particles should be in the range of 5-75 microns, with most of the particles, by weight, being less than 60 microns, and less than 10% by weight being less than 10 microns. Preferably most of the promoter is in the form of 20-50 micron particles.

The optimum particle size is also a function of promoter support density, and of the FCC catalyst density. Conventional FCC catalysts have an ABD or about 0.9 to 1.0 g/cc. When such FCC catalysts are used, it is preferred that the density of the promoter support be at least 10% greater, and preferably at least 20% greater than the density of the cracking catalyst.

The preferred support will have a relatively high density. High density supports have greater strength than low density supports, and thus will last longer in the erosive environment of the dense phase fluidized bed. Denser particles will also be retained longer in the unit so that there will be less loss of Pt with fines.

The most preferred support will be one which will have a significantly different density than the fines produced.

COMBUSTION PROMOTER SEGREGATION

Preferably, the CO combustion promoter is used in the form of relatively fine particulates (as compared to the bulk of the material in the fluidized bed) which tend to accumulate or segregate to the top of the fluidized bed.

Most of the CO combustion promoter should be in the upper one half of the dense bed, and preferably most of the promoter is in the upper ⅓ (by volume) of the fluidized dense bed.

This minimizes NOx emissions and maximizes the effectiveness of the Pt. Promoter segregation allows much of the coke combustion to occur in a relatively reducing atmosphere, with large amounts of CO present. Effectiveness of use of Pt CO combustion promoter is maximized because the promoter collects in the upper portions of the bed and acts as a catalytic filter to eliminate or reduce CO emissions. Use of a heavy, settling promoter would avoid all loss or carry over of promoter, but would not be effective in converting CO formed by combustion of coal or coke remaining on spent FCC catalyst in the upper portions of the fluidized bed. CO formed near the top of the bed will not be catalytically afterburned to CO2 by CO combustion promoter which collects in the lower portions of the fluidized dense bed.

Promoter segregation is promoted by minimizing bed turbulence and large velocity gradients in the dense bed. As discussed previously, in the section labelled bed geometry, an increase in bed diameter is a good way to reduce vapor velocity, and have a sharper distinction between dense bed and dilute phase.

The size and density of the CO combustion promoter should be selected so that the promoter will have a terminal velocity below that of the fines produced during normal FCC operations.

The CO combustion promoter may be a drum of the Pt on alumina material available from several vendors for use in FCC units. The Pt should be on a highly porous support for maximum effectiveness.

PROMOTER RECYCLE

The best CO combustion promoters are also those which will be readily swept out of the fluidized dense bed. The same properties which cause segregation of the promoter within the dense bed also cause preferential loss of promoter from the dense bed, as compared to the conventionally sized catalyst or other particulates making up most of the dense bed.

Higher loss of promoter can often be justified, if it allows a unit to continue operating without exceeding local limits on NOx emissions. In those instances where there is excessive loss of promoter with fines discharged in the flue gas it will be beneficial to recover the promoter from the fines discharged with the flue gas and recycle the promoter to the dense bed.

Use of a CO combustion promoter on a dense material will permit separation of promoter from fines downstream of the dense bed combustion unit. Separation may be poorly but easily done in another fluidized bed, with the more dense particles settling to the bottom of the bed. Usually the CO combustion promoter particles will be the denser, but by careful selection of the promoter support, and depending on the density of the material in the catalyst bed (such as the FCC catalyst) the promoter may be either the light or the dense material relative to the density of the material making up the bulk of the dense bed.

The preferred way to separate combustion promoter from fines is by putting the fines and promoter in a fluid with a density intermediate the fines and the CO combustion promoter. If the CO combustion promoter is on a dense support, with an apparent bulk density (ABD) greater than one, and a true density in water in excess of 3-4 g/cc, and the FCC catalyst fines have a true density in water less than that of the promoter, then flotation separation in a dense fluid, such as a brine, can be used to recover.

Conventional methods of augmenting separation of liquid phases based on density differences, such as centrifuging, may be used to improve the efficiency of separation.

A ballistic separation technique can also be used, relying on the different settling velocity of the promoter and the fines in a gas.

Of these promoter recovery methods, the separation by flotation or density separation in a liquid will yield the sharpest separation, but may not be justified in some instances because of the cost of wetting, phase separation, etc.

Depending on the amount of CO combustion promoter used in the process, and lost with the fines, it may be desirable to operate with several stages of fines/promoter separation. All of the material discharged with the flue gas may be subjected to a first, rather crude, separation by relying on density differences in a small, ancillary fluidized bed to ring about some recovery of combustion promoter. Next a liquid phase separation may be used to recover some of the promoter particles for reuse.

The cost of the recovery methods can be minimized by accepting only mediocre recovery of promoter, and spending only minimal amounts to effect promoter recovery from fines.

For each pass of gas through the dense bed combustion zone, more than 99% of the promoter inventory should be retained within the fluidized bed, either due to natural settling or by use of one or more stages of cyclone separation.

When an external promoter recovery means is used, it should recover at least 10% of the platinum, or other promoter metal. Preferably at least 50% of the promoter is recovered in an external means and recycled.

The invention will now be described in more detail with reference to the Figures.

FIG. 1 shows a conventional FCC regenerator 10 which can be used in the practice of the present invention. First the conventional operation of the FCC regenerator will be discussed, then the process of the invention will be discussed.

Spent catalyst is added to regenerator 10 via line 14. Oxygen containing gas, preferably air, is added via line 18 to conventional air distributor 8 in the lower portion of the regenerator. Coke is burned to CO and CO2 in the dense bed 22 of the regenerator. Spent catalyst 14 will usually have a CO combustion promoter, e.g., an additive of alumina with 1-1000 wt. ppm Pt, present in an amount sufficient to add the desired amount, typically 0.1 to 10 ppm Pt to the FCC catalyst inventory. Most of the CO formed in the dense bed is rapidly burned to CO2 in the dense bed. Regenerated catalyst is withdrawn via line 16 for reuse within a conventional FCC reactor, not shown.

The dense bed of catalyst 22 has an upper level 24. Products of combustion, typically NOx, SOx, CO2, minor amounts of CO, minor amounts of oxygen, and inerts such as nitrogen, pass from dense bed 22 into dilute phase 32. A significant amount of catalyst fines is usually entrained in the flue gas, so conventional FCC units pass the flue gas through the inlet 26 of a cyclone 20 to recover entrained catalyst and catalyst fines so that relatively solids-free flue gas can be discharged via line 12. Entrained catalyst and fines removed by cyclone 20 from flue gas are usually discharged through dipleg 28 back into the dense bed of catalyst 22.

Although only a single cyclone is shown in the drawing, commercially most FCC regenerators have quite a few cyclones. Usually there are two sets of cyclones, primary and secondary. A typical FCC regenerator might have eight primary cyclones, each discharging into a secondary cyclone, resulting in 16 cyclones in all. In addition, third or even higher stage cyclones can be used to recover more catalyst and catalyst fines for return to the FCC regenerator. Electrostatic precipitators, porous stainless steel filters, and similar devices can all be used to recover small sized particles and return them to the FCC regenerator.

FIG. 1 - INVENTION

The process of the present invention may be implemented into a conventional FCC regenerator such as that of FIG. 1 by adding a CO combustion promoter which tends to rise in the FCC regenerator dense bed. Addition of somewhat smaller sized combustion particles, perhaps in conjunction with use of coarser FCC catalyst, will result in a net migration of CO combustion promoter to the upper portions of the FCC regenerator.

Because of the segregation of CO combustion promoter within the upper portions of the FCC regenerator dense bed, there is less CO combustion promoter in the bottom of the regenerator dense bed, permitting significant concentrations of CO to be present there. Although not all of the carbon monoxide is afterburned to CO2 within the lower portion of the dense bed of the regenerator, most of the coke is removed there. As the coke burns, the nitrogen compounds contained in the coke burn to NOx. The NOx formed reacts with the CO to form CO2 and N2. Much of the remaining CO is combusted to CO2 within the upper portions of the dense bed of the regenerator, where most of the CO combustion promoter is located.

Further modifications can also be made to optimize operation, e.g., restricting somewhat the amount of air that is added to the bottom of the dense bed regenerator, and optionally adding additional combustion air to the upper portion of the dense bed. This helps ensure that there is a reducing atmosphere in the lower portion of the bed and an oxidizing atmosphere in the upper portion of the regeneration bed. Most of the combustion air should be added to the bottom of the dense bed. When split air addition is practiced, from 1-50% of the total amount of air added can be added to the upper portion of the bed, preferably 3-30%.

A drawback to the approach of FIG. 1 is that reliance solely upon very small particles of CO combustion promoter, or use of a low density CO combustion promoter additive results in somewhat higher losses of CO combustion promoter. This is because a certain portion of the promoter is lost with the flue gas, despite the use of a cyclone separator. Another minor problem with the use of a dipleg 28, as shown in the Figure, is that a significant amount of the entrained CO combustion promoter returned via the dipleg is swept along with regenerated catalyst back to the FCC reactor, via line 18. The increased concentration of CO promoter near interface 24 may not be achieved to the extent desired.

FIG. 2 - CYCLONE RECOVERY OF PROMOTER

FIG. 2 shows some modifications to the FCC regenerator which aid in establishing an increased concentration of CO combustion promoter in the upper portion of the FCC regenerator dense bed.

FIG. 2 shows the addition of a secondary cyclone 120, receiving flue gas via exhaust line 126 from primary cyclone 20. Flue gas, with a substantially reduced content of entrained catalyst and the CO combustion promoter, is removed from the system via line 112. Catalyst, catalyst fines, and CO combustion promoter are discharged from cyclone 120 via dipleg 128 to the upper portion of the dense bed 22. The flapper valve 130 at the bottom of dipleg 128 is a conventional design which allows catalyst particles to leave dipleg 128, but does not allow flue gas to enter the standpipe. A seal pot of flow control valve on the dipleg would accomplish the same thing, prevention of reverse flow up dipleg 128.

In FIG. 2, split air flow is shown to help create a reducing atmosphere in the bottom of the bed. Some of the combustion air is added via line 218 and distributor 208.

Further modifications of the design shown in FIG. 1 or in FIG. 2 can be made to permit selective recovery of catalyst fines from the primary cyclone exhaust. Extra stages of cyclones, bag filters, porous stainless steel filters, electrostatic precipitators and the like can be used to recover, and preferably recycle, promoter to the dense bed, preferably the upper portion of it. Selective removal of catalyst fines, with a high concentration of CO combustion promoter, also permits regeneration or recovery of the promoter. This can be economically advantageous when platinum or other expensive noble metals are used as CO combustion promoters. It also facilitates rapid change in promoter composition if a refiner wants to go from a mono-metallic promoter to bi-metallic promoter or the reverse.

FIG. 3 - EXTERNAL PROMOTER RECOVERY

The embodiment shown in FIG. 3 is a preferred embodiment of the present invention, which allows for at least one stage of recovery of high density promoter from catalyst fines.

In this embodiment, regenerator 310 functions like regenerator 10 shown in FIG. 2. Spent catalyst is added via line 314, while regenerated catalyst is removed via line 316. Regeneration air is added via line 318 and distributor 308.

CO combustion promoter tends to segregate and collect in the upper regions of dense phase fluidized bed 322. Quite a lot of the CO combustion promoter is swept out despite the use of primary and secondary cyclones 320 and 420 to recover preferentially catalyst and combustion promoter, respectively. The catalyst fines, and a fair amount of combustion promoter, are removed from the regenerator via flue gas outlet 412 and passed to a promoter recovery means 610 comprising a third stage of gas/solids separation, shown as a cyclone 520 in the Figure. The third stage recovers much of the CO combustion promoter, preferably in excess of 50%, and discharges this promoter along with large amounts of catalyst fines down via dipleg 528 into bed 605. A small amount of fluidization gas, such as the air stream admitted via line 618 and distributor 608, gently fluidizes the dense bed of fines and CO combustion promoter. Promoter, being on a high density support, tends to settle to the bottom of the vessel and can be easily recycled to the regenerator, preferably to an upper portion thereof, via line 530. Catalyst fines can be removed for disposal, or further processing, by means not shown, for additional recovery of CO combustion promoter.

Although third stage cyclones are shown in the Figure, operating directly on the flue gas from the FCC regenerator, it may be preferred in many units to use electrostatic precipitators, a bag house, or other conventional means to collect much of the fines and dust discharged from the regenerator. All or a portion of the recovered fines, etc., recovered in this way may be charged to a relatively small fluidization vessel to permit a separation of promoter from fines by density differences. Alternatively, or in addition to this separation, the fines may be placed in a liquid with a density intermediate the fines and the promoter. This can effect a very sharp separation between promoter and fines.

EXAMPLE 1

CONVENTIONAL CO OXIDATION PROMOTER

The CO combustion promoter is a Pt on alumina additive with the properties shown in Table 1. These additives, and many more, are commercially available.

TABLE 1

| Conventional CO Oxidation Promoters | | |
|---|---|---|
| | A | B |
| Real Density, g/cc | 2.718 | 2.718 |
| Particle Density, g/cc | 1.597 | 1.619 |
| MSA Particle Size Distribution, % wt | | |
| 0-20 microns | 2.4 | 0.0 |
| 20-40 microns | 12.2 | 13.2 |
| 40-60 microns | 31.7 | 34.2 |
| 60-80 microns | 29.3 | 31.5 |
| 80+ microns | 24.4 | 21.1 |
| Average Particle Size, microns | 62.1 | 61.3 |
| Platinum Promoter Level, ppm | 101 | 431 |

This example is provided to show the particle size distribution of conventional CO combustion promoters. The particle size distribution is similar to the particle size distribution of conventional FCC equilibrium catalyst.

EXAMPLE 2

FINES SEGREGATION - LARGE GRADIENT

R. A. Kolbe reported that in a fluidized bed, with an L/D of about 2.4, a mixture of 28-60 mesh particles and particles less than 325 mesh segregated quite sharply when the superficial gas velocity up through the bed was 0.8 feet per second. The upper ½ of the dense phase fluidized bed contained 90 wt % less than 325 mesh particles and 10 wt % 28-60 mesh particles. The lower 1/2 of the dense bed contained roughly 100 wt % 28-60 mesh particles. Data from R. A. Kolbe, PhD Thesis, University of West Virginia (1952).

Kolbe's data show excellent particle separation, but are not directly applicable to FCC regenerators as the fine particles (the less than 325 mesh material) could not efficiently be captured by existing technology in FCC units.

EXAMPLE 3

FINES SEGREGATION - SMALL GRADIENT

Data much closer to conventional FCC operation are reported by G. L. Osbelg and D. H. Charlesworth, Chem Eng. Prog. 566, (1951)

| | Relative con. of 50 micron fines | |
|---|---|---|
| Avg. Bed Part. | In Bottom ⅔ | In Top ⅓ Bed |
| 68 microns | 1.0 | 3.2 |

| | Conc. 36 micron fines, Wt % | |
|---|---|---|
| Avg. Bed Part. | In Bottom 95% | In Top 5% Bed |
| 58 microns | 1.73 | 2.47 |
| 68 microns | 1.98 | 3.04 |
| 145 microns | 1.76 | 2.51 |

These data were obtained at a superficial gas velocity of 11.9 cm/s. The superficial gas velocity at incipient fluidization was less than 4cm/s, so the bed was well mixed. The bed L/D was 2.

These data show that significant segregation of 50 micron size particles can occur in fluidized bed with an average particle size of 68 microns. Many conventional FCC units operate with catalyst inventories having an average particle size of 60-80 microns. It is fairly easy to design primary and secondary cyclones to recover essentially all of the particles of 50 microns and larger, indeed, most operating FCC units routinely recover essentially all of the particles in excess of 20 microns and keep them in the unit.

EXAMPLE 4

NOX V. PT

Tests were conducted in a commercial FCC unit, operating with a single dense bed of catalyst in the regenerator. The feed contained 1600 ppm nitrogen. The FCC regenerator operated with an average dense bed temperature of 1280 F. There was 1.0 volume % $O_2$ in the regenerator flue gas.

| Top temperature | 970° F. |
|---|---|
| Combined Feed Ratio | 1.05 |
| Catalyst to oil ratio | 5.0 |
| Reactor pressure | 28 psig |
| Conversion | 60 vol. % |

The CO combustion catalyst was uniformly distributed within the regenerator. The flue gas contained 2100 mg/Nm3 of Nox, 70 ppm CO, 1.0 mole % O2 at 7 ppm Pt on catalyst. Other tests were conducted with different levels of Pt, to generate the data represented by FIG. 4.

No changes were observed in the commercial FCC reactor/regenerator operation with changes in Pt level that affected the operability of the cracking unit, other than the reduction in Nox in the flue gas. In practicing the invention the dense bed temperature will be the same, since the same amount of combustion is occurring. Therefore, the catalyst/oil ration and all other process variables will be essentially unchanged.

If practicing the invention commercially now, I would use a CO combustion promoter in the form of 40-60 micron particles, with an ABD of about 1.0-1.1 g/cm3 into an FCC regenerator. These will segregate to the upper ⅓of the dense bed of catalyst. I would carefully control the amount of excess air added, as addition of too much excess air makes it hard to create a reducing atmosphere in the lower portion of the FCC regenerator. Addition of insufficient air would result in increased CO emissions, which could be compensated to some extent by use of more CO combustion promoter. I would use at least 2 stages of cyclones in the regenerator, and would discharge both cyclones near the upper portions of the dense bed.

Preferably 60 to 90% of the CO combustion promoter is in the upper half of the dense bed.

Promoter levels will be about the same, or slightly higher than used conventionally.

ILLUSTRATIVE EMBODIMENT

The effects of the invention re. reducing NOx emissions were estimated.

A particle distribution was assumed which meshed with that achieved in the fluidized bed test of Example 2. 100% of the CO combustion promoter was assumed to segregate into the upper 10% of the commercial FCC regenerator.

The flue gas NOx concentration will be less than 750 mg/Nm3, my best estimate is about 500 mg/Nm3.

The reason NOx emissions can be reduced so much is because most of the coke burns in the lower part of the bed and forms CO. The CO probably reacts with the NOx.

Even if a much smaller Pt segregation is achieved, there can still be a great decrease in NOx emissions. A concentration of only 2.3 from the bottom of the bed to the top can reduce NOx emissions by more than 50%, while maintaining essentially complete combustion of CO.

Reducing the Pt content in the bottom of the bed from 7 ppm to 3 ppm will decrease NOx from 2100 mg/Nm3 to 900 mg/Nm3. By segregating the remaining Pt near the upper portion of the bed, almost complete CO combustion can be maintained while keeping the NOx levels at a low level associated with lower Pt levels.

I claim:

1. In a process for the fluidized bed regeneration of coke containing fluidized catalytic cracking (FCC) catalyst having an average particle size and an average settling velocity in an FCC regenerator operating in conjunction with an FCC reactor and conventional FCC catalyst and wherein oxygen or an oxygen containing gas is added to a single, dense phase fluidized bed of said FCC catalyst particles said dense bed comprising a lower one half and an upper one half, and wherein coke on said FCC catalyst is burned in the dense bed to produce regenerated catalyst, heat and a flue gas containing CO, CO2, O2 and NOx, the improvement comprising adding a CO combustion promoter in an amount sufficient to increase the combustion of CO to CO2 in the dense bed, said CO combustion promoter being disposed on particles, with most of the promoter particles, by weight, having a particle size within the range of 20-50 microns and a density at least 10% greater than the density of said conventional FCC catalyst and a settling velocity which is smaller than the settling velocity of the average particles in the dense phase fluidized bed whereby said CO combustion promoter segregates in the dense phase fluidized bed so that at least 60% of the combustion promoter is present in the upper one half of the dense bed and maintaining a reducing atmosphere in the lower one half of the dense bed and converting therein at least a portion of the NOx produced during combustion to nitrogen in the reducing atmosphere.

2. The process of claim 1 wherein the FCC regenerator operates in a substantially complete CO combustion mode to produce a flue gas containing at lease an order of magnitude more CO2 than CO, on a molar basis.

3. The process of claim 1 wherein the CO combustion promoter has an apparent bulk density of 0.9 to 2.0 g/cc.

4. The process of claim 1 wherein the CO combustion promoter has an apparent bulk density of 1.0 to 1.2 g/cc.

5. The process of claim 1 further characterized in that the CO combustion promoter comprises 0.01 to 50 ppm of platinum group metal or other metal with an equivalent CO oxidation activity, on an elemental metal basis, based on the weight of catalyst particles in the regenerator.

6. The process of claim 2 wherein the CO combustion promoter and catalyst are entrained in the flue gas from the dense bed and primary and secondary stages of cyclone separation are provided in the regenerator for recovery of catalyst from flue gas, and wherein catalyst recovered from the primary stage cyclone is discharged back into the dense bed of catalyst, and catalyst recovered from the secondary cyclone stage is discharged above the point of discharge of catalyst from the primary stage cyclone.

7. The process of claim 1 further characterized in that some air or oxygen containing gas is added to a bottom portion of the regenerator dense bed and to the upper one-half of the dense bed in the regenerator and the amount of air or oxygen containing gas added is controlled to ensure that there is a reducing atmosphere in the lower portion of the dense bed and an oxidizing atmosphere in the upper portion of the dense bed.

8. The process of claim 1 wherein a flue gas stream comprising catalyst fines and entrained CO combustion promoter is removed from the fluidized bed catalyst regeneration process, a mixture of fines and entrained CO combustion promoter is recovered from the flue gas, and the mixture is resolved into a CO combustion promoter rich phase and a fines phase with a reduced concentration of CO combustion promoter, and the promoter rich phase is recycled to the fluidized bed catalyst regeneration process.

9. The process of claim 8 wherein the mixture is resolved by fluidization in a dense phase fluidized bed external to the fluidized bed catalyst regeneration process.

10. The process of claim 8 wherein the CO combustion promoter has a density and the fines have a density which is different from the density of the CO combustion promoter has a density and the fines have a density which is different from the density of the CO combustion promoter and the mixture is added to a liquid with a density intermediate the density of the fines and the CO combustion promoter, and the CO combustion promoter in the CO combustion promoter rich liquid phase is recycled to the fluidized bed combustion process.

11. The process of claim 1 wherein the dense phase fluidized bed has a vertical length to horizontal diameter ration of at least 2.

* * * * *